United States Statutory Invention Registration [19]

[11] Reg. Number: H169

Mackenzie et al. [43] Published: Dec. 2, 1986

[54] IGNITION COMPOSITION

[75] Inventors: Gerald L. Mackenzie, Port Tobacco; Robert O. Petri, La Plata; James E. Rose, Bryans Road, all of Md.

[73] Assignee: The United States of America as represented by the Secretary of the Navy, Washington, D.C.

[21] Appl. No.: 870,674

[22] Filed: May 22, 1986

[51] Int. Cl.[4] ..... C06B 27/00; C06B 45/10

[52] U.S. Cl. ..... 149/19.3; 149/87; 149/108.6

[56] References Cited

U.S. PATENT DOCUMENTS 3,753,811 8/1973 Julian et al. ..... 149/19

*Primary Examiner*—John F. Terapane
*Assistant Examiner*—Susan Wolffe
*Attorney, Agent, or Firm*—Robert F. Beers; Thomas E. McDonnell

[57] ABSTRACT

An igniter composition for a gas generator comprises a stoichiometric combination of pyrotechnic metal selected from the group consisting of beryllium, boron, lithium, sodium, titanium, magnesium, aluminum and alloys and mixtures thereof and one or more halogenated polymers; and fumed colloidal silica in an amount from about 0.5 to about 2.5 percent of the total composition weight.

12 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

IGNITION COMPOSITION

BACKGROUND OF THE INVENTION

The invention pertains generally to energetic materials and in particular to pyrotechnic ignition materials.

Propellants, because of thermal-stability and insensitivity requirements, are difficult to ignite. Ignition of these propellants requires the inclusion of a cartridge or pellet of a pyrotechnic material.

The presently used pyrotechnic ignition materials comprise either boron and potassium nitrate or magnesium, polytetrafluoroethylene and polytrifluorochloroethylene. The compositions have heat outputs of about 1400 calories per gram, which, unfortunately, cannot reliably ignite some propellants. To increase the energy of the ignition compositions, additives, similar to additives in high-energy propellants and explosives, are added. Examples of ignition compositions with increased heat are given in U.S. Pat. No. 3,753,811 by Julian et al.

A stoichiometric mixture of polytetraethylene and magnesium produces about 2000 calories/gram which is sufficient to reliably ignite all known propellants. This composition would be simple to process and would be relatively inexpensive. Unfortunately, the composition is very difficult to ignite and does not burn in stoichiometry.

SUMMARY OF THE INVENTION

An object of the present invention is to provide a pyrotechnic composition that is suitable for igniting any known propellant.

Another object of this invention is to increase the ignitability of the stoichiometric combinations of halogenated polymers and high-energy metals and maximize their combustion.

A further object of this invention is to increase the ignitability of a stoichiometric combination of magnesium and polytetrafluoroethylene and maximize its combustion.

These and other objects are achieved by the inclusion of not more than 2.5 weight percent of fumed colloidal silica in a composition consisting essentially of one or more halogenated polymers and one or more high-energy metals.

DETAILED DESCRIPTION OF THE INVENTION

A possible mechanism for the surprising effect produced by the inclusion of a small amount of fumed colloidal silica or the combustion of one or more halogenated polymers with one or more high-energy metals is that the silica produces a nearly homogenous distribution of the two components. This mechanism is given by way of explanation and is not intended to limit this disclosure and the claims to follow in any manner.

Since the highest energy is from the stoichiometric combination of a high-energy metal and polytetrafluoroethylene and this combination is extremely difficult to ignite and burn completely, the greatest benefit of the invention is realized with this combination. Accordingly, the preferred halogenated polymer is polytetrafluoroethylene (PTFE). Other suitable polymers include polytrifluorochloroethylene, polyhexafluoropropylene, and the copolymer of vinyledene fluoride and hexafluoropropylene. The preferred high-energy metal is magnesium. Other suitable metals, including metalloids, have a heat of combustion for oxide formation of at least 4.0 kilo-calories per gram and are lightweight. These metals are beryllium, boron, aluminum, titanium, and alloys of these metals in which the above metals comprise at least ninety percent and have the requisite heat of combustion for the oxide formation. One such alloy is an alloy of two of the above metals, i.e., magnesium and aluminum. The composition of the Mg-Al alloy that is particularly important consists of 1 to 15 weight of aluminum and the balance of magnesium.

The greatest energy is produced from a stoichiometric combination of a halogenated polymer and a high-energy metal. Hence, preferred compositions comprise stoichiometric or nearly stoichiometric amounts of these ingredients. Inclusion of silica would improve the combustion of nonstoichiometric combinations also. Significant benefits are realized with polymer-metal combinations within about 10 to 12 percent of stoichiometry. For a Mg-PTFE combination, the stoichiometric amount for magnesium is 33 weight percent and for polytetrafluoroethylene is 67 weight percent. Hence, a composition of magnesium, polytetrafluoroethylene, and two weight percent of silica would consist of 32.3 weight percent of magnesium, 65.7 of polytetrafluoroethylene, and 2 weight percent silica. In general, a PTFE-Mg composition comprises from about 31.5 to 34 weight percent of magnesium, from about 63.5 to 68 weight of polytetrafluoroethylene, and from about 0.5 to 2.5 weight percent of fumed colloidal silica. The preferred composition comprises from 32.4 to 32.6 weight percent of magnesium, from 65.5 to 65.9 of PTFE, and from 1.5 to 2 weight percent of silica.

Fumed colloidal silica is available under the tradename of Cab-O-Sil. The silica particles have an average particle size of less than about five micrometers and are characterized by minute pores. It is prepared by a coagulation of hydrated silica. The amount of silica is from about 0.5 to about 2.5 percent of total composition weight. The preferred amount is from 1 to 2 weight percent and the most preferred amount is 1.5 to 2.0 weight percent. It is important that the silica has less than about 0.1 weight percent of water. The weight percent is based on total silica weight.

The preferred method of preparation comprises placing the powdered metal and halogenated polymer, both with an average particle size from 5 to 50 micrometers with 10 to 50 micrometers preferred, in a blender; mixing for at least about 30 minutes; removing relatively large agglomerates by, e.g., screening; and mixing again for at least about 15 minutes. The composition is then processed into the actual article of use, e.g., tablet or cartridge.

To better illustrate the practice of the present invention and its advantages, the following examples are given. It is understood that these examples are given by way of illustration and are not meant to limit the disclosure or the claims to follow in any manner.

EXAMPLE I

Dry magnesium powder (325 mesh), powdered DuPont Teflon No. 6, and Cab-O-Sil in the respective amounts of 33 grams, 67 grams, and 2 grams were tumbled in a P-K Twin-Shell blender for 45 minutes, screened through 12 mesh, and tumbled for an additional 30 minutes. The powder appeared to have extremely uniform mix with no visible agglomerates.

Five-gram pellets were pressed from the powder and tested.

The first test consisted of igniting two pellets by means of a match. Both pellets readily ignited. The second test was a Parr Calorimeter-Bomb test of three pellets to determine the amount of energy produced. The results were 1982 cal/gm, 1987 cal/gm and 1979 cal/gm.

These results compared very favorably with the theoretical amount of 2000 cal/gm and the consistency of the results demonstrates that the powder mixture had a high degree of uniformity.

EXAMPLE II

EXAMPLE I was repeated except that no Cab-O-Sil was added. When the mixture was screened, many more agglomerates were screened out than were screened in EXAMPLE I. The mixture after the second mixing did not appear to be as uniform in appearance as the mixture in EXAMPLE I.

Ignition of three pellets by a match was not possible. One gram of a composition comprising carboxy-terminated polybutadiene and about 88 weight percent of ammonium perchlorate was combined with the pellets. The pellets ignited, but a sizeable residue remained after ignition, indicating that complete combustion had not occurred. The results from the calorimeter bomb tests were 1123 cal/gm, 1248 cal/gm and 1306 cal/gm. The reduction in energy output indicated an inadequate combustion and the inconsistency of the results indicated a nonuniformity in the mix.

EXAMPLE III

EXAMPLE I was repeated except that 1.5 grams of Cab-O-Sil were added. The calorimeter results from two five-gram pellets were 1975 cal/gm and 1988 cal/gm. The results were comparable to those in EXAMPLE I.

The results in the above examples demonstrate that the inclusion of a small amount of fumed colloidal silica into a mixture of one or more halogenated polymers and one or more high-energy metals significantly increases the ignitability and degree of combustion of the mixture. The results appear to confirm the hypothesis that nonuniformity is the cause of poor ignition of stoichiometric mixtures of halogenated polymers and high-energy metals.

Obviously, many modifications and variations of the present invention are possible in light of the above teachings. It is therefore to be understood that, within the scope of the appended claims, the invention may be practiced otherwise than as specifically described.

What is claimed is:

1. An igniter composition for a gas generator comprises, on the basis of total composition weight, from about 97.5 to about 99.5 percent of a stoichiometric combination of a pyrotechnic metal selected from the group consisting of beryllium, lithium, sodium, titanium, magnesium, aluminum, boron and alloys and mixtures thereof and one or more halogenated polymers; and from about 0.5 to 2.5 percent of fumed colloidal silica.

2. The igniter composition of claim 1 wherein said pyrotechnic metal is selected from the group consisting of magnesium, alloys of magnesium and aluminum wherein the amount of aluminum is from about 1 to 15 percent of the total alloy weight, and mixtures thereof.

3. The igniter composition of claim 1 wherein said halogenated polymer is selected from the group consisting of fluoropolymers and fluorochloropolymers.

4. The igniter composition of claim 2 wherein said halogenated polymer is selected from the group consisting of fluoropolymers and fluorochloropolymers.

5. The igniter composition of claim 4 wherein said halogenated polymer is a fluoropolymer.

6. The igniter composition of claim 4 wherein the amount of said silica is from 1 to 2 percent.

7. The igniter composition of claim 5 wherein the amount of said silica is from 1 to 2 percent.

8. The igniter composition of claim 5 wherein said halogenated polymer is a perfluoropolymer and said pyrotechnic metal is magnesium.

9. The igniter composition of claim 8 wherein the amount of said silica is from 1.5 to 2.0 percent.

10. The igniter composition of claim 9 wherein said halogenated polymer is polytetrafluoroethylene.

11. An igniter composition for a gas generator comprises, on the basis of total composition weight, from about 31.5 to 34 percent of magnesium; from about 63.5 to 68 percent of polytetrafluoroethylene, and from about 0.5 to 2.5 percent of fumed colloidal silica.

12. The igniter composition of claim 11 wherein the amount of polytetrafluoroethylene is from 32.4 to 32.5 percent and the amount of fumed colloidal silica is from 1.5 to 2.0 percent.

* * * * *